(12) United States Patent
Sosnowski

(10) Patent No.: US 7,223,137 B1
(45) Date of Patent: May 29, 2007

(54) FLOATING, WATER CURRENT-DRIVEN ELECTRICAL POWER GENERATION SYSTEM

(76) Inventor: Michael J. Sosnowski, 752 Crystal St., Peckville, PA (US) 18452

( * ) Notice: Subject to any disclaimer, the term of this patent is extended or adjusted under 35 U.S.C. 154(b) by 106 days.

(21) Appl. No.: 11/182,435

(22) Filed: Jul. 15, 2005

(51) Int. Cl.
*B63H 21/20* (2006.01)

(52) U.S. Cl. ............................................. 440/3; 290/54
(58) Field of Classification Search ...................... None
See application file for complete search history.

(56) References Cited

U.S. PATENT DOCUMENTS

| | | | |
|---|---|---|---|
| 3,986,787 A | 10/1976 | Mouton, Jr. et al. | |
| 4,352,990 A * | 10/1982 | Aucoin, Jr. ................... | 290/54 |
| 4,598,210 A | 7/1986 | Biscomb | |
| 4,725,195 A | 2/1988 | Wiggs | |
| 4,843,249 A | 6/1989 | Bussiere | |
| 5,051,059 A * | 9/1991 | Rademacher ................... | 415/7 |
| 6,551,053 B1 * | 4/2003 | Schuetz ....................... | 415/3.1 |
| 6,695,536 B2 * | 2/2004 | Sanchez Gomez ........... | 290/53 |
| 7,063,579 B2 * | 6/2006 | Voves ............................ | 440/3 |

* cited by examiner

*Primary Examiner*—Lars A. Olson
(74) *Attorney, Agent, or Firm*—Mark Levy & Associates, PLLC

(57) ABSTRACT

A floating, water current-driven electrical power generation system has a hull supporting one or more paddle wheels. The unit is tethered in a stream or river so that the moving water turns the paddle wheel coupled to an electrical generator. A transmission matches stream flow conditions to the electrical generator. Stabilizing fins on the hull bottom help keep the hull properly aligned in the stream's current. Built-in leg structures are sized to prevent bottoming of the paddle wheel during periods of low water in the stream or river. Mounts are provided for an outboard motor useful for propelling the unit to a desired location. Larger versions of the system may be equipped with a boat mooring facility allowing a boat to propel the unit to a desired position in a stream or river.

20 Claims, 5 Drawing Sheets

FLOATING, WATER CURRENT-DRIVEN ELECTRICAL POWER GENERATION SYSTEM

FIELD OF THE INVENTION

The present invention pertains to water-driven electrical generators and, more particularly to a floating, water current-driven electrical power generation system.

BACKGROUND OF THE INVENTION

Harnessing the potential or kinetic energy of water to provide motive force or, more especially, electrical power is well known. Vast hydroelectric projects take advantage of the potential energy available from water falling from one elevation to a lower elevation. On a smaller scale, water wheels and other similar mechanism have long been utilized to turn mill stones, and to power industrial machinery. In addition, stationary water wheels have, in fact, been used to turn small electrical generators.

However, traditional water wheels suffer from many disadvantages. Most importantly, they must be located near an uninterrupted source of water to function. This generally requires construction of a dam to impound sufficient water to overcome seasonal rainfall variations. Dam construction is typically both expensive and environmentally problematic. Obtaining a construction permit for a dam is no small feat. It would, therefore, be advantageous to utilize a "portable" water wheel to capture energy from moving water without need for a permanent structure, especially a dam.

DISCUSSION OF THE RELATED ART

Attempts to provide portable structures capable of harvesting energy from flowing water may be found in the prior art. For example, U.S. Pat. No. 4,598,210 for WATER CURRENT MOTOR, issued Jul. 1, 1986 to Lloyd I. Biscomb teaches a floating hull having a pair of paddle wheels extending outwardly from the sides thereof. The BISCOMB paddle wheels drive a central rotary load, for example, an air compressor, water pump, or electrical generator. The BISCOMB hull is adapted for tethered mooring in a stream of flowing water.

U.S. Pat. No. 3,986,787 for RIVER TURBINE, issued Oct. 19, 1976 to William J. Mouton, Jr. et al. discloses another floating structure adapted for capturing energy from the flowing water of a stream. MOUTON et al. utilize a pair of flow-through turbines supported beneath a floating platform which may be tethered to an anchor in the stream bed. An electrical generator mounted on the deck receives mechanical input from the turbines to produce electrical power therefrom.

U.S. Pat. No. 4,725,195 for ADVANCED PIGGYBACK WATER POWER GENERATOR, issued Feb. 16, 1988 to B. Ryland Wiggs provides a pontoon-supported, paddle wheel-driven electrical power generation system adapted to be tethered in a flowing stream.

U.S. Pat. No. 4,843,249 for HYDROELECTRIC SYSTEM, issued Jun. 27, 1989 to Jean L. Bussiere, shows a leg-support hydro-powered electrical power generation system. The BUSSIERE system is free to move vertically on its support posts and uses a paddle wheel to capture wave in relatively large bodies of water.

None of the forgoing patents, taken individually or in any combination, are seen to describe or suggest the novel floating, water current-driven electrical power generation system of the invention.

SUMMARY OF THE INVENTION

In accordance with the present invention, there is provided a floating, water current-driven electrical power generation system. A hull supporting one or more paddle wheels adapted to interact with the water current in a river or stream, is tethered, typically at least two points to help ensure positional stability of the hull relative the stream bed or other fixed location. The paddle wheel (or wheels) turns a shaft thereby producing rotary motion. The shaft's rotary motion is transmitted to an electrical generator or alternator through a transmission that allows matching stream flow conditions to the electrical generator or alternator. Stabilizing fins on the hull bottom help keep the hull properly aligned in the stream's current. Built-in leg structures are provided that are useful during construction or for servicing the unit and/or for storing the unit when in dry dock. The legs are sized to prevent bottoming of the paddle wheel during periods of low water in the stream or river.

The inventive system may be provided in a variety of sizes depending upon the stream conditions and/or the amount of electrical energy required. Mounts are provided to accommodate an outboard motor useful for propelling the unit to a desired location in a stream or river. Other versions of the inventive electrical power generation system may be equipped with a boat mooring facility which may also be used to interact with a boat whereby a larger unit may be propelled and steered to a desired position in a stream or river.

It is, therefore, an object of the invention to provide a floating, water current-powered electrical power generation system.

It is another object of the invention to provide a floating, water current-powered electrical power generation system having a buoyant hull supporting a platform.

It is a further object of the invention to provide a floating, water current-powered electrical power generation system having one or more water (i.e., paddle) wheels or the like supported on a platform thereof.

It is an additional object of the invention to provide a floating, water current-powered electrical power generation system having an electrical generator or alternator mounted on a platfrom thereof.

It is an object of the invention to provide a floating, water current-powered electrical power generation system having a variable speed drive, transmission, or gearbox between the paddle wheel and the generator.

It is a further object of the invention to provide a floating, water current-powered electrical power generation system wherein the hull is made from or treated with a rustproof material.

It is an additional object of the invention to provide a floating, water current-powered electrical power generation system having a catamaran hull for stability.

It is yet another object of the invention to provide a floating, water current-powered electrical power generation system having legs attached to the hull to facilitate service and storage, and to prevent bottoming of the paddle wheel.

It is a further object of the invention to provide a floating, water current-powered electrical power generation system having a protective structure to keep debris away from the paddle wheel.

It is a still further object of the invention to provide a floating, water current-powered electrical power generation system having an included step-up transformer.

It is another object of the invention to provide a floating, water current-powered electrical power generation system having at least one outboard motor mount on the hull.

It is yet another object of the invention to provide a floating, water current-powered electrical power generation system having a buoyant hull including a boat mooring facility.

It is another object of the invention to provide a floating, water current-powered electrical power generation system having a weather-proof covering over the generator, alternator and/or other system components.

It is an additional object of the invention to provide a floating, water current-powered electrical power generation system adapted for ganged deployment.

It is a still further object of the invention to provide a floating, water current-powered electrical power generation system having one or more structures adapted to direct water towards the paddle wheel.

It is an object of the invention to provide a floating, water current-powered electrical power generation system having emergency systems such as a drag anchor and a paddle wheel lock.

It is another object of the invention to provide a floating, water current-powered electrical power generation system having warning lights for installation on systems deployed in navigable waters.

BRIEF DESCRIPTION OF THE DRAWINGS

A complete understanding of the present invention may be obtained by reference to the accompanying drawings when considered in conjunction with the subsequent detailed description, in which.

DESCRIPTION OF THE PREFERRED EMBODIMENT

The present invention features a floating electrical power generation system for deployment in flowing streams, rivers, and other such bodies of water. The term river or stream is used hereinafter to describe any suitable body of water in which the electrical power generation system of the invention can be successfully operated.

Figure 1:
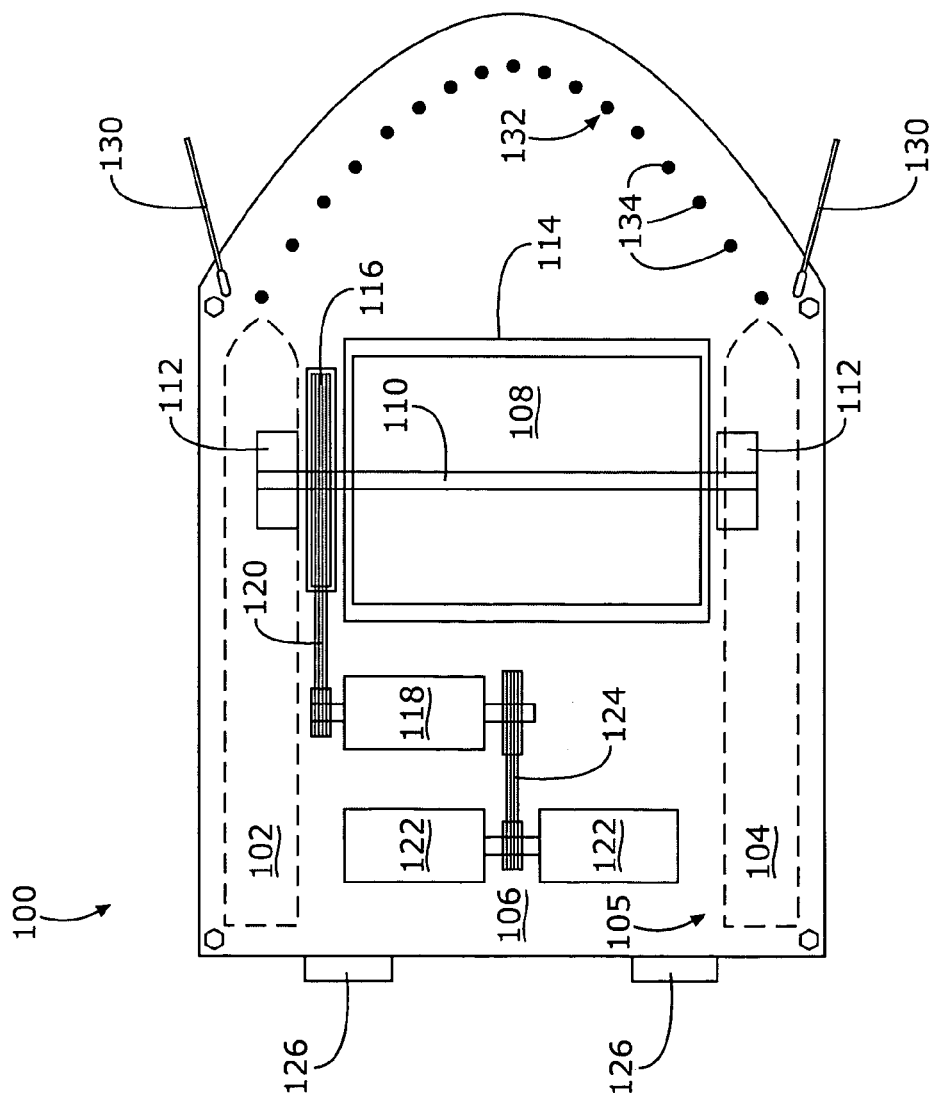
FIG. 1 is a schematic, top plan view of the floating, water current-driven electrical power generation system of the invention.

Referring first to FIG. 1, there is shown a schematic, top plan view of one embodiment of the floating electrical power generation system of the invention, generally at reference number 100. A pair of pontoons, port pontoon 102 and starboard pontoon 104, forms a catamaran-style hull 105. A planar platform 106 is affixed to an upper surface of pontoons 102, 104. While a catamaran-style hull 105 has been chosen for purposes of disclosure, it will be recognized that other hull styles and types may also be used to implement the inventive electrical generation system 100. Consequently, the invention is not considered limited to any particular hull style or type but covers any and all suitable hull types.

A paddle wheel 108 is supported on a central shaft 110, disposed between pontoons 102, 104 through an opening 114 in platform 106. Central shaft 110 is supported in bearing housings 112. Central shaft 110 has a pulley, bull gear, or other suitable power take off 116 affixed thereto.

A transmission or gearbox 118 is mounted adjacent paddle wheel 108 and is operatively connected to power take off 116 by a suitable power transfer arrangement 120. Such a power transfer arrangement 120 may be one or more V-belts, poly V-belts, gog belts, a gear train, or any other suitable arrangement whereby rotary motion at power take off 116 is transferred to an input of transmission or gearbox 118. Such coupling arrangements are known to those of skill in the rotating machinery arts and are not further described herein. The invention is not considered limited to the V-belt drive chosen for purposes of disclosure. Rather, the invention encompasses any and all suitable power transfer mechanisms.

One or more generators 122 are connected to transmission or gearbox 118 by a second power transfer arrangement 124. Like power transfer arrangement 120, any suitable mechanism including, but not limited to, V-belts, poly V-belts, cog belts, or a gear train, etc. may be used to perform the necessary power transfer function. Generator 122 is used to represent any useful rotating machine which may be powered by application of rotary motion to an input thereof. Examples of such rotary machines, in addition to generators or alternators, include air compressors and pumps. While generator 122 has been chosen for purposes of disclosure, it is intended to represent any such rotary machine. It will be recognized that multiple generators 122 may be driven by transmission or gearbox 118 using any suitable coupling arrangement.

The use of the term generator herein encompasses alternators as well as generators. The term generator is used generically for purposes of simplicity.

A pair of outboard motor mounts 126 is disposed at a stern region of platform 106 and adapted to mount an outboard motor, not shown, or similar motive device to system 100. Tandem outboard motors, not shown, of course, may also be used.

Mooring attachment points 128 are typically disposed near the forward port and starboard corners of platform 106 and are adapted for attachment of a mooring cable, rods or rope 130.

Figure 4:
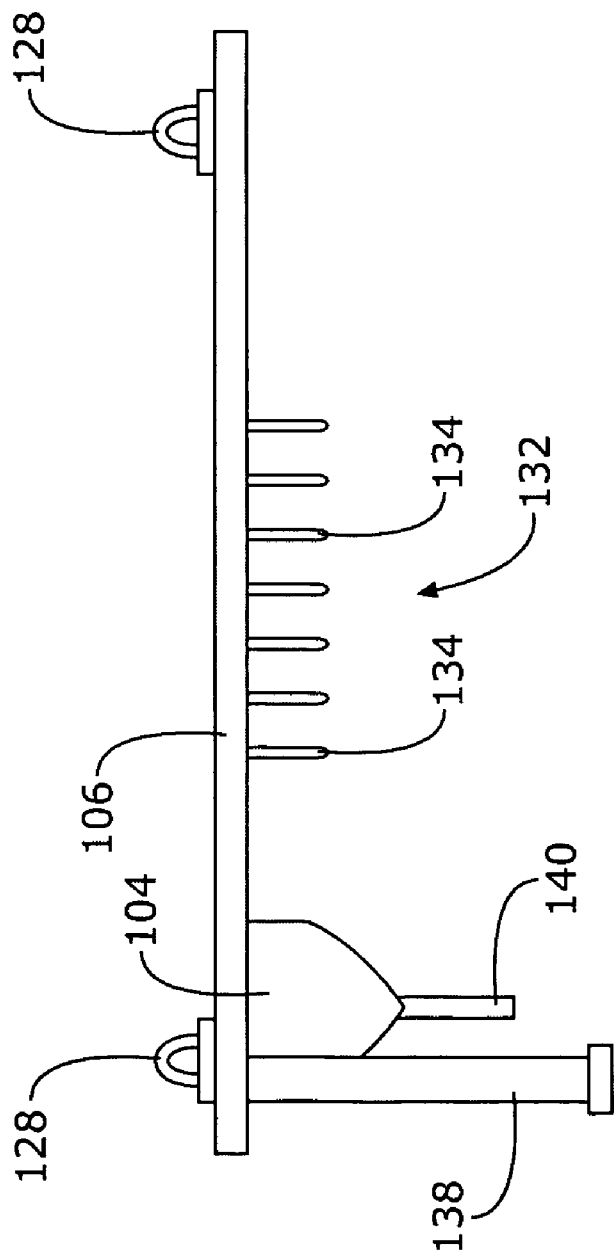
FIG. 4 is detailed view of the debris guard portion of the electrical power generation system of FIG. 1.

A debris guard 132 having debris guard fingers 134 is disposed at the forward edge of platform 106. Fingers 134 may best be seen in FIGS. 2 and 4. It will be recognized that other arrangements may be provided to prevent water-borne debris from jamming or injuring paddle wheel 108. The invention is not considered limited to the particular debris guard arrangement chosen for purposes of disclosure. It will further be recognized that additional debris guards not mechanically affixed to electrical power generation system 100 may also be placed upstream therefrom when required.

Figure 2:
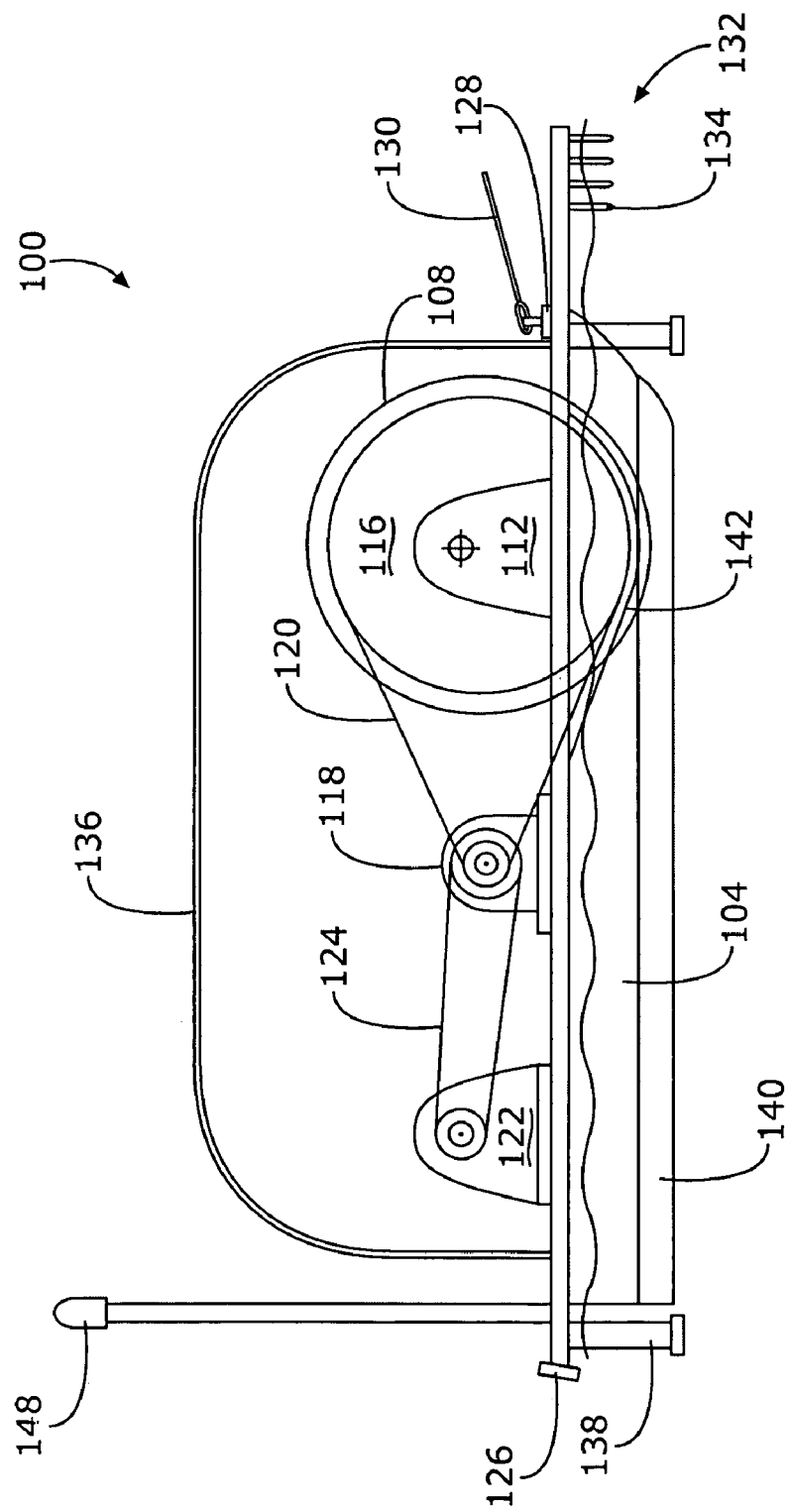
FIG. 2 is a schematic, side view of the power generation system of FIG. 1.
Figure 3:
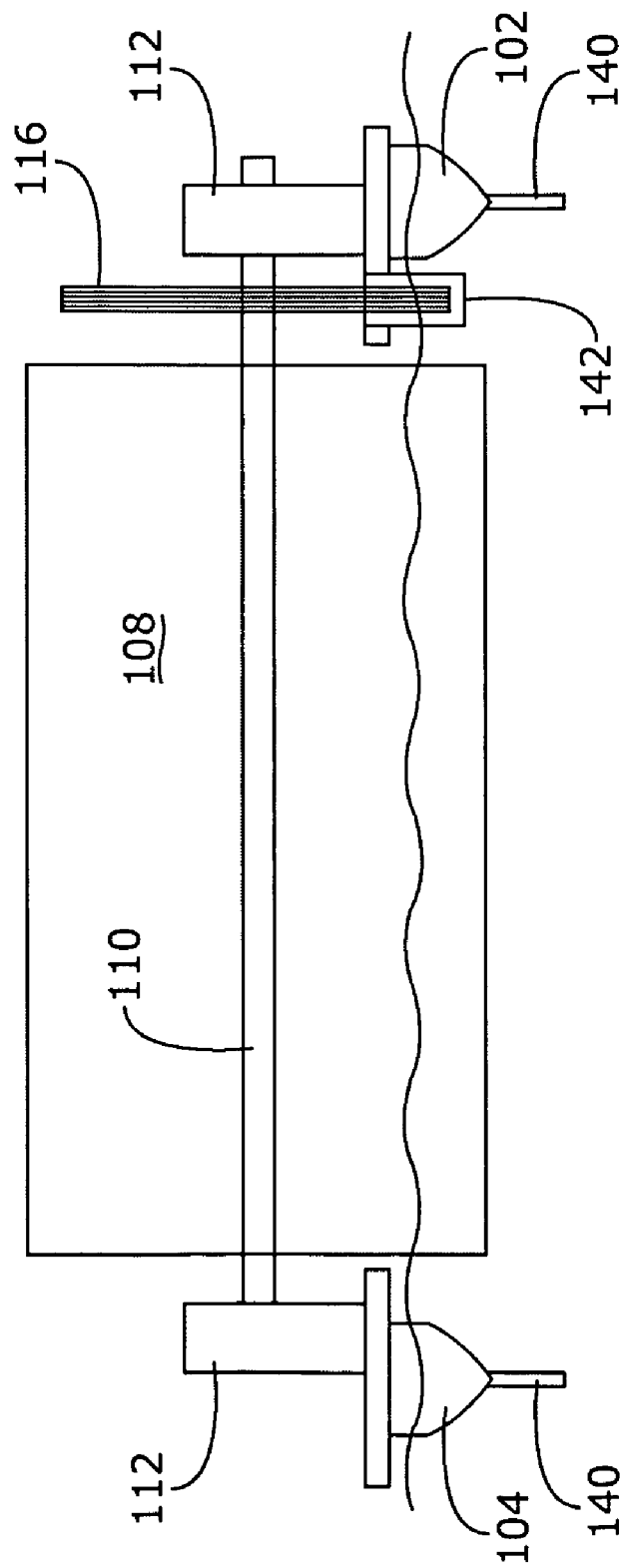
FIG. 3 is a partial schematic front elevational view of the power generation system of FIG. 1.

Referring now also to FIG. 2, there is shown a schematic, side elevational view of the inventive floating, water current-driven electrical power generation system 100. A weatherproof housing 136 may be provided to protect components such as generator 122, transmission or gearbox 118, etc. from weather and/or spray from the stream or river. In addition, housing 136 is useful for protecting system 100 from vandalism or other unauthorized access. Housing 136 may be made from fiberglass, aluminum, or other thermoplastic resins or metals. Housing 136 may be attached to platfrom 106 using any suitable attachment system, not shown. In alternate embodiments, housing 136 may be hingedly attached to platform 106. One or more suitable locks, not shown, may be provided to prevent unauthorized removal of housing 136 from platform 106.

Legs 138 are provided, typically around the periphery of platform 106. Legs 138 have a minimum length extending below fins 140 and also corresponding to the radius of paddle wheel 108 projecting beneath platform 106. Legs 138 have several functions, notably to prevent the bottoming of paddle wheel 108 during periods of low water. In addition, legs 138 are potentially useful during the construction of system 100 and/or for dry docking system 100 during winter months. Legs 138 may be rigidly or slidably and adjustably attached to platform 106 using mounting or height-adjusting mechanisms known to those skilled in the art. Typically, at least four legs 138 are provided. Legs 138 are typically disposed near the four corners of the rectangular portion of platform 106. It will be recognized that other numbers of legs may be chosen to meet a particular operating circumstance or environment. Consequently, the invention is not considered limited to any particular number, style, attachment point, or attachment modality of legs 138 but covers any number of legs attached to platform 106 in any manner.

Port and starboard pontoons 102, 104 may be equipped with downward-projecting fins 140 disposed along a longitudinal major axis thereof. Fins 140 provide a stabilizing force to keep pontoons 102, 104 aligned with the current of the stream or river in which system 100 is deployed.

A waterproof housing 142 may optionally be provided to keep power take (i.e., pulley or bull gear 116) dry. Housing 142 allows pulley or gear to have a relatively large diameter without exposing it or any encircling belts 120 to water.

It is anticipated that electrical power generation system 100 may be provided in a range of different physical sizes with corresponding generation capacities. On small versions of system 100, a single or tandem outboard motor attached to outboard motor mounts 126 will be sufficient to propel and steer system 100 to a desired position in a river or stream. Larger versions of system 100 may be too large and/or unmaneuverable to be placed in a desired location using only one or more outboard motors.

Figure 5:
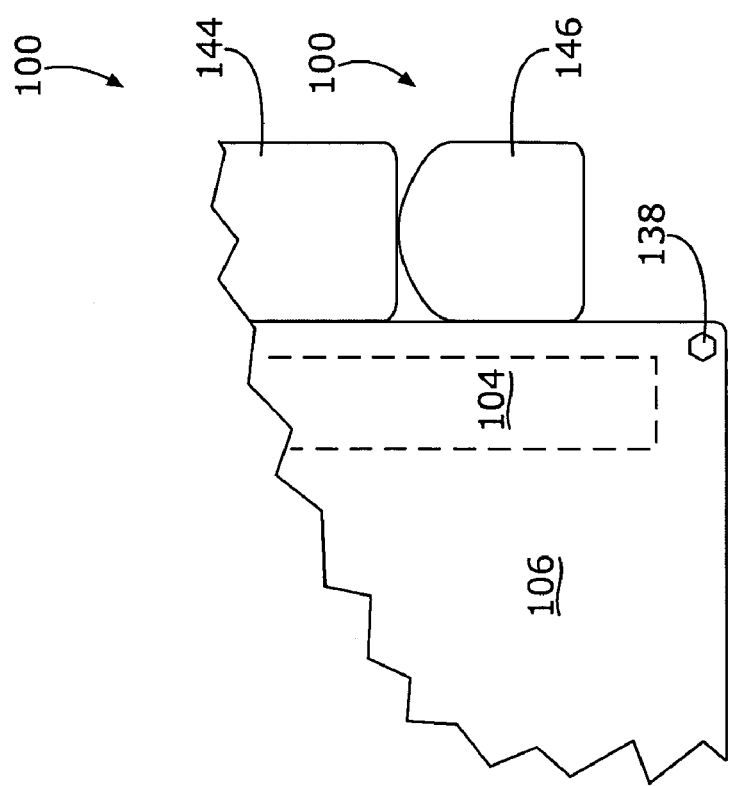
FIG. 5 is a partial top plan schematic view of a portion of the deck of the electrical power generation system of FIG. 1 showing a boat mooring feature thereof.

Referring now to FIG. 5, there is shown a top, plan view of a portion of system 100 showing a boat mooring facility 144 formed in platform 106 and a boat 146 moored thereat. Boat 146 forms no part of the instant invention and is shown only to illustrate the intended function of boat mooring facility 144. Boat 146 may be used as a tug boat to push system 100 to a desired position in a stream or river. It will be recognized that boat mooring facility 144 may be disposed in positions other than the starboard position chosen for purposes of disclosure, the exact position forming no part of the invention. Mooring facility 144 also provides a convenient docking facility for a boat used to transport service personnel to the platform 106 of the electrical power generation system 100.

If the inventive floating, water current-driven electrical power generation system 100 of the invention is to be used in navigable waters, it is imperative that appropriate navigational lights be provided in accordance with United States Coast Guard regulations, local regulations, or any other authority having such a requirement. Lights may be disposed on masts or directly attached to platform 106 as required. An exemplary stern navigation light 148 may be seen in FIG. 2. The selection and placement of navigational lights for watercraft is well known to those of skill in the art and is not further described herein.

In operation, the inventive electrical power generation system 100 may be constructed in a dry dock where legs 138 elevate paddle wheel 108 above a deck or other surface. When desired, system 100 may be placed into a flowing body of water and navigated to a desired location thereupon by an outboard motor, not shown, attached to platfrom 106 at outboard motor mounts 126. Alternatively, if platform 106 is equipped with a boat mooring facility 144, boat 146 may be used as a tugboat to navigate the system 100 to its desired location.

Once in position, cables, rods or ropes 130 or the like may be used to tether the system 100 in the river or stream. In small streams, shore based attachment points, not shown, are preferable as such fixed attachment points are not subject to movement by water currents in the stream or river. If shore attachment is not possible, anchor blocks, not shown, or other types of mooring may be provided. Anchor blocks and the like are well known to those of skill in the marine construction arts and are not further described herein. Mooring attachment points 128 are typically provided at or near the outer corners of platform 106 to allow a two-point anchoring system to be used thereby optimizing alignment of the hull of system 100 with the water current.

Paddle wheel 108 extends beneath platform 106 and is rotated by the action of water against the blades thereof. The rotation of paddle wheel 108 turns power take off device 116 (e.g., a pulley or bull gear). Rotary motion of power take off 116 is transferred to an input of transmission or gearbox 118 by belts 120. The output of transmission or gearbox 118 is, likewise, coupled to generator 122 by belt 124. Transmission or gearbox 118 is used to manually, semi-automatically, or fully automatically control the rotational speed of generator 122 as water current conditions in the stream or river change. Such control of transmission or gearbox 118 is well understood by those of skill in the art; a more complete description of the operation thereof is not included herein. As previously stated, transmission or gearbox 118 may be a gearless transmission using one or more conical pulleys to maintain a substantially constant speed of generator 122 regardless of the rotational speed of paddle wheel 108.

Electrical power from generator may be used to charge an on-vessel battery to power navigational lights, etc. A step-up transformer, not shown, may raise the generator voltage to minimize transmission losses to shore. Power transmission to shore may be by an underwater or an overhead cable, not shown.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A floating, water current-powered electrical generation system, comprising:
   a) a buoyant hull supporting a substantially horizontal platform on an upper surface thereof, said hull being adapted to float in a flowing body of water
   b) a paddle wheel rotatively supported upon said platform and adapted for engagement with and rotation by water in said flowing body of water c) an electrical generator operatively connected to said paddle wheel for producing an electrical current when turned thereby; and d) at least one leg projecting downwardly from a lower surface of said hull, said at least one leg being adapted for preventing bottoming of said paddle wheel when said flowing body of water is insufficiently deep.

2. The floating, water current-powered electrical generation system as recited in claim 1, wherein said flowing body of water comprises at least one of a stream, a creek, and a river.

3. The floating, water current-powered electrical generation system as recited in claim 1, further comprising:

e) at least two mooring attachment points attached to said horizontal platform, each of said at least two mooring attachment points being adapted to secure said electrical power generation system to a fixed point relative to said flowing body of water.

4. The floating, water current-powered electrical generation system as recited in claim 1, further comprising:

e) a fin disposed on said hull substantially parallel to a longitudinal major axis thereof, said fin extending substantially downward from a lower surface of said hull.

5. The floating, water current-powered electrical generation system as recited in claim 4, wherein said hull comprises a catamaran having at least two pontoons.

6. The floating, water current-powered electrical generation system as recited in claim 5, wherein said paddle wheel is disposed intermediately of two of said at least two pontoons.

7. The floating, water current-powered electrical generation system as recited in claim 1, further comprising:

e) a transmission operatively interposed between said paddle wheel and said electrical generator.

8. The floating, water current-powered electrical generation system as recited in claim 7, wherein said transmission comprises a gearbox.

9. The floating, water current-powered electrical generation system as recited in claim 1, wherein said at least one leg is vertically adjustable with respect to a bottom surface of said horizontal platform.

10. The floating, water current-powered electrical generation system as recited in claim 1, further comprising:

e) of at least one navigational light.

11. The floating, water current-powered electrical generation system as recited in claim 1, further comprising:

e) an outer housing substantially covering an upper surface of said horizontal platform, an upper portion of said paddle wheel, and said electrical generator.

12. The floating, water current-powered electrical generation system as recited in claim 11, wherein said outer housing is attached to said horizontal platform in one of the following manners: removably attached, hingedly attached, and lockably attached.

13. The floating, water current-powered electrical generation system as recited in claim 1, further comprising:

e) at least one attachment point for an outboard motor.

14. The floating, water current-powered electrical generation system as recited in claim 1, wherein said paddle wheel comprises at least two paddle wheels.

15. The floating, water current-powered electrical generation system as recited in claim 1, wherein said generator is replaced by at least one rotary machine from the following group: compressor, pump, and other rotary machine.

16. The floating, water current-powered electrical generation system as recited in claim 1, further comprising:

e) a boat mooring facility adapted to receive and moor a boat;

whereby said boat may be used to propel and steer said electrical generation system to a desired position in a river or stream.

17. The floating, water current-powered electrical generation system as recited in claim 1, further comprising:

e) a waterproof housing for at least partially enclosing a power take off apparatus disposed adjacent said paddle wheel.

18. The floating, water current-powered electrical generation system as recited in claim 1, further comprising:

e) a debris screen operatively attached to said horizontal platform and disposed forward of said paddle wheel.

19. The floating, water current-powered electrical generation system as recited in claim 1, said water current-powered electrical generation system being provided in a family of different sizes and electrical generation capacities.

20. The floating, water current-powered electrical generation system as recited in claim 1, wherein said water current-powered electrical generation system is adapted for ganged, multi-unit deployment in a river or stream.

* * * * *